I. J. W. Adams,
Earth Auger.

N° 12,303.     Patented Jan. 30, 1855.

UNITED STATES PATENT OFFICE.

I. J. W. ADAMS, OF SHARPTOWN, MARYLAND.

IMPLEMENT FOR BORING WELLS.

Specification of Letters Patent No. 12,303, dated January 30, 1855.

*To all whom it may concern:*

Be it known that I, I. J. W. ADAMS, of Sharptown, in the county of Somerset and State of Maryland, have invented a new and Improved Implement for Boring Wells, &c.; and I do hereby declare that the following is a full, clear, and exact description of the same, reference being had to the annexed drawings, making a part of this specification, in which—

Figure 1:
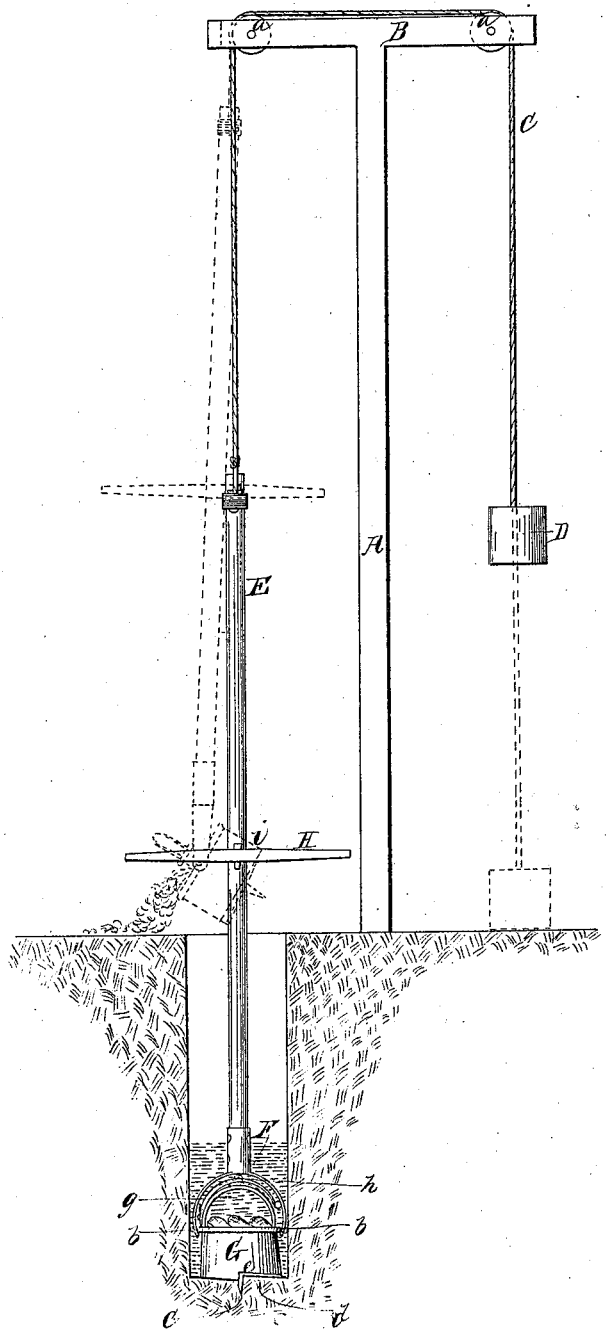
Figure 2:
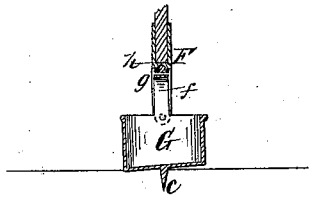

Figure 1, is a view of my improved implement in elevation. Fig. 2, is a vertical section of the auger, the plane of section being through the center.

Similar letters of reference indicate corresponding parts in the two figures.

The nature of my invention consists in the employment or use of a spring attachment applied to an auger or borer arranged as will be hereafter fully shown and described, whereby said auger or borer is held in its proper position while being operated, and at the same time allowed to be turned so as to be emptied of its contents.

To enable others skilled in the art to fully understand and construct my invention I will proceed to describe it.

A, Fig. 1, represents a vertical post firmly secured in the ground, the height of this post should somewhat exceed the depth of the hole to be bored.

B, is a cross piece framed to the top of the post A, and having a pulley (*a*) at each end.

C, is a rope or chain which passes over the pulleys (*a*) (*a*) and has a weight D, attached to one end.

E, is the shank or pole of the auger, the upper part of which is attached to the end of the rope or chain C, opposite to the end to which the weight D, is attached. To the lower end of the shank or pole E, there is permanently secured a bail F of semi-circular form, to the lower ends of which there is secured by pivots (*b*) (*b*) a cylindrical vessel G, having a spur (*c*) at the center of its bottom and a cutting edge (*d*) and an opening (*e*) which extends from the spur (*c*) to the edge of the bottom of the vessel. The lower ends of the bail F, are attached to the upper edge of the vessel G, which with its spur (*c*) and cutting edge (*d*) on its bottom form a hollow auger or borer.

The auger is provided with a semi-circular handle (*f*) to one side of which there is secured one end of a spring (*g*) which is also of semicircular form and having a knob or projection (*h*) on its outer surface, which knob or projection, when the auger is in an upright position fits in a corresponding cavity in the under side of the bail F, and keeps the auger in its proper position, see Figs. 1 and 2.

H, is a handle on the shank or pole E, said handle being allowed to move up and down on the shank or pole, and prevented from turning upon it by a key (*i*).

Operation: The operator turns the handle H, and thereby rotates the shank or pole E, and auger G, which works its way into the earth by cutting and forcing the earth within it through the opening (*e*). A few revolutions of the handle H, is sufficient to fill the auger when, the shank or pole and auger is raised by the operator the weight D, by its gravity assisting. The auger is raised to the surface of the earth, or a short distance above it, and the operator grasps the outer end of the spring (*g*) and depresses it thereby drawing the knob or projection (*h*) out of the cavity in the bail, and the auger is then turned or inverted swinging upon the pivots (*b*) (*b*) and its contents fall out, see red lines Fig. 1, the auger readjusting itself. The auger is then replaced in the hole and the above operation repeated until the hole is made the required depth.

I do not claim the hollow auger G, for that has been previously used, but,

What I do claim as new and desire to secure by Letters Patent, is—

The employment or use of the spring (*g*) attached to the handle (*f*) of the swinging or suspended auger G, and arranged substantially as herein shown, viz, with a knob or projection (*h*) on its outer surface, which knob or projection catches into a cavity in the under surface of the bail F, for the purpose of holding the auger in its proper position while being operated.

I. J. W. ADAMS.

Witnesses:
THOMAS ROBINSON,
JONATHAN M. BENSON.